US011569552B2

(12) United States Patent
Kitaoka et al.

(10) Patent No.: US 11,569,552 B2
(45) Date of Patent: Jan. 31, 2023

(54) PRISMATIC SECONDARY BATTERY AND ASSEMBLED BATTERY USING THE SAME

(71) Applicant: SANYO Electric Co., Ltd., Daito (JP)

(72) Inventors: Kazuhiro Kitaoka, Hyogo (JP);
Masakazu Yamada, Hyogo (JP); Yohei Muroya, Hyogo (JP)

(73) Assignee: SANYO Electric Co., Ltd., Daito (JP)

(*) Notice: Subject to any disclaimer, the term of this patent is extended or adjusted under 35 U.S.C. 154(b) by 0 days.

(21) Appl. No.: 17/490,696

(22) Filed: Sep. 30, 2021

(65) Prior Publication Data

US 2022/0021086 A1 Jan. 20, 2022

Related U.S. Application Data

(60) Division of application No. 16/278,993, filed on Feb. 19, 2019, now Pat. No. 11,165,125, which is a
(Continued)

(30) Foreign Application Priority Data

Mar. 30, 2015 (JP) ................................. 2015-068195

(51) Int. Cl.
*H01M 50/538* (2021.01)
*H01M 10/0587* (2010.01)
(Continued)

(52) U.S. Cl.
CPC ..... *H01M 50/538* (2021.01); *H01M 10/0431* (2013.01); *H01M 10/0587* (2013.01);
(Continued)

(58) Field of Classification Search
CPC ............. H01M 50/102; H01M 50/103; H01M 50/538; H01M 10/04; H01M 10/0431; H01M 10/0587
See application file for complete search history.

(56) References Cited

U.S. PATENT DOCUMENTS 10,249,867 B2 * 4/2019 Kitaoka ............ H01M 10/0587
2006/0051664 A1 3/2006 Tasai et al.
(Continued)

FOREIGN PATENT DOCUMENTS

CN 100508248 C 7/2009
CN 101542817 A 9/2009
(Continued)

OTHER PUBLICATIONS

English Translation of Search Report dated Sep. 19, 2019, issued in counterpart CN Application No. 201610176916.1, with English translation (4 pages).
(Continued)

*Primary Examiner* — Karie O'Neill Apicella
(74) *Attorney, Agent, or Firm* — WHDA, LLP

(57) ABSTRACT

A flat-shaped winding electrode body in which a positive electrode plate and a negative electrode plate are wound with a separator interposed therebetween includes a positive electrode tab portion and a negative electrode tab portion at one end in a direction in which a winding axis of the winding electrode body extends. Two pieces of the flat-shaped winding electrode body are housed in a prismatic outer body so that the winding axis of each piece is disposed in a direction perpendicular to a sealing plate, and the positive electrode tab portion and the negative electrode tab portion are located on one end of the winding electrode body closer to the sealing plate than the other end.

4 Claims, 16 Drawing Sheets

Related U.S. Application Data continuation of application No. 15/065,145, filed on Mar. 9, 2016, now Pat. No. 10,249,867.

(51) Int. Cl.
  *H01M 10/04* (2006.01)
  *H01M 50/10* (2021.01)
  *H01M 50/20* (2021.01)
  *H01M 50/116* (2021.01)
  *H01M 50/502* (2021.01)
  *H01M 50/528* (2021.01)

(52) U.S. Cl.
  CPC ......... *H01M 50/10* (2021.01); *H01M 50/116* (2021.01); *H01M 50/20* (2021.01); *H01M 50/502* (2021.01); *H01M 50/528* (2021.01); *H01M 2220/20* (2013.01)

(56) References Cited

U.S. PATENT DOCUMENTS

| | | |
|---|---|---|
| 2009/0004561 A1 | 1/2009 | Nansaka et al. |
| 2009/0239133 A1 | 9/2009 | Kosugi |
| 2010/0233526 A1 | 9/2010 | Tasai et al. |
| 2011/0129707 A1 | 6/2011 | Ahn et al. |
| 2012/0171553 A1 | 7/2012 | Guen et al. |
| 2015/0364727 A1 | 12/2015 | Kim |

FOREIGN PATENT DOCUMENTS

| | | |
|---|---|---|
| CN | 102082254 A | 6/2011 |
| JP | 8-115729 A | 5/1996 |
| JP | 9-213299 A | 8/1997 |
| JP | 10-261440 A | 9/1998 |
| JP | 2008-226625 A | 9/2008 |
| JP | 2009-32640 A | 2/2009 |
| JP | 2011-171079 A | 9/2011 |
| JP | 2013-105586 A | 5/2013 |
| JP | 2015-011919 A | 1/2015 |
| JP | 2016-4777 A | 1/2016 |
| KR | 10-2012-0079612 A | 7/2012 |
| WO | 2014/141554 A1 | 9/2014 |

OTHER PUBLICATIONS

English Translation of Chinese Office Action dated Sep. 5, 2022, issued in counterpart CN application No. 202110227012.8. (4 pages).

* cited by examiner

20

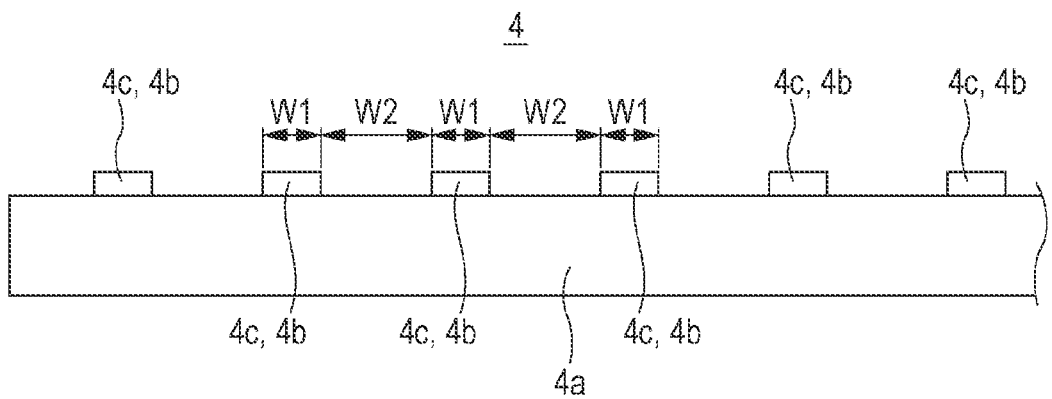
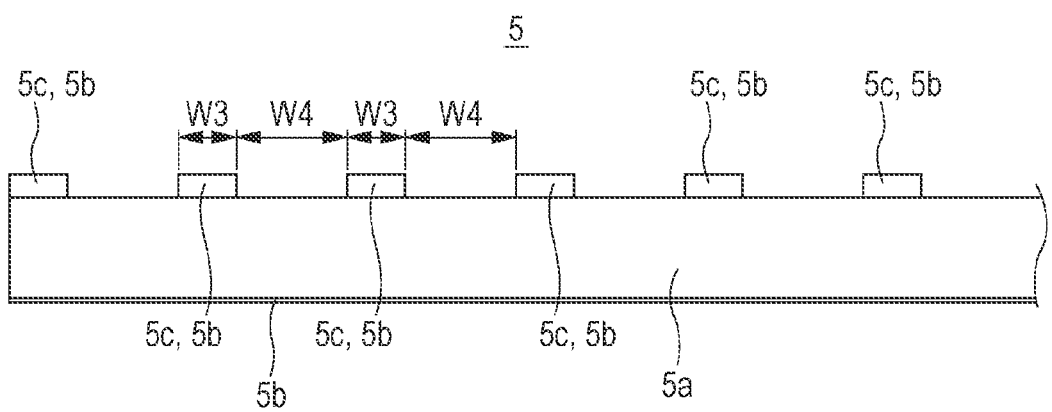

PRISMATIC SECONDARY BATTERY AND ASSEMBLED BATTERY USING THE SAME

CROSS REFERENCE TO RELATED APPLICATIONS

This application is a divisional of U.S. application Ser. No. 16/278,993, filed on Feb. 19, 2019, which is a continuation of U.S. application Ser. No. 15/065,145, filed on Mar. 9, 2016, which is based upon and claims the benefit of priority of the prior Japanese Patent Application No. 2015-068195, filed on Mar. 30, 2015, the entire contents of which are incorporated herein by reference.

TECHNICAL FIELD

Background of the Invention

Field of the Invention

The present disclosure relates to a prismatic secondary battery and an assembled battery using the prismatic secondary battery.

Description of Related Art

In drive power supplies of electric vehicles (EV) and hybrid electric vehicles (HEV, PHEV), a secondary battery such as an alkaline secondary battery or a nonaqueous electrolyte secondary battery is used. For these applications, high capacity or high output characteristics is demanded, and thus an assembled battery is used in which a large number of prismatic secondary batteries are connected in series or in parallel.

In those prismatic secondary batteries, a battery case is formed by a bottomed tubular prismatic outer body having an opening, and a sealing plate that seals the opening. An electrode body including a positive electrode plate, a negative electrode plate, and a separator is housed in the battery case along with an electrolytic solution. A positive electrode terminal and a negative electrode terminal are fixed to the sealing plate. The positive electrode terminal is electrically connected to the positive electrode plate via a positive electrode current collector, and the negative electrode terminal is electrically connected to the negative electrode plate via a negative electrode current collector.

The positive electrode plate includes a positive electrode core made of metal, and a positive electrode active material layer formed on the surface of the positive electrode core. In part of the positive electrode core, a positive electrode core exposed portion is formed in which a positive electrode active material layer is not formed. The positive electrode current collector is then connected to the positive electrode core exposed portion. Also, the negative electrode plate includes a negative electrode core made of metal, and a negative electrode active material layer formed on the surface of the negative electrode core. In part of the negative electrode core, a negative electrode core exposed portion is formed in which a negative electrode active material layer is not formed. The negative electrode current collector is then connected to the negative electrode core exposed portion.

For instance, Japanese Published Unexamined Patent Application No. 2009-032640 (Patent Document 1) proposes a prismatic secondary battery using a winding electrode body which has a positive electrode core exposed portion wound at one end and a negative electrode core exposed portion wound at the other end. Also, Japanese Published Unexamined Patent Application No. 2008-226625 (Patent Document 2) proposes a prismatic secondary battery using a winding electrode body which is provided with a positive electrode core exposed portion and a negative electrode core exposed portion at one end.

BRIEF SUMMARY OF THE INVENTION

Regarding in-vehicle secondary batteries, particularly secondary batteries used for EV or PHEV, development of a large-capacity secondary battery having a higher volume energy density is called for. In the case of the prismatic secondary battery disclosed in Patent Document 1, the battery case needs the space on the right and left for disposing wound positive electrode core exposed portion and wound negative electrode core exposed portion, and needs an upper space between a sealing plate and a winding electrode body. This is a factor that makes it difficult to increase the volume energy density of the secondary battery.

On the other hand, when a winding electrode body provided with a positive electrode core exposed portion and a negative electrode core exposed portion at one end is used as in the prismatic secondary battery disclosed in Patent Document 2, a prismatic secondary battery having a high volume energy density is likely to be obtained.

However, the prismatic secondary battery disclosed in Patent Document 2 is likely to have a complicated structure of the current collector compared with the prismatic secondary battery disclosed in Patent Document 1.

An object of the present disclosure is to provide a high-capacity prismatic secondary battery having a high volume energy density and an assembled battery using the prismatic secondary battery.

A prismatic secondary battery according to an embodiment of the present disclosure includes: a flat-shaped winding electrode body in which a positive electrode plate and a negative electrode plate are wound with a separator interposed therebetween; a prismatic outer body that has an opening and that houses the winding electrode body; a sealing plate that seals the opening; a positive electrode terminal that is electrically connected to the positive electrode plate and attached to the sealing plate; a positive electrode current collector that electrically connects the positive electrode plate and the positive electrode terminal; a negative electrode terminal that is electrically connected to the negative electrode plate and attached to the sealing plate; and a negative electrode current collector that electrically connects the negative electrode plate and the negative electrode terminal. The winding electrode body includes a positive electrode tab portion and a negative electrode tab portion at one end in a direction in which a winding axis of the winding electrode body extends, and at least two pieces of the winding electrode body are housed in the prismatic outer body so that the winding axis of each piece is disposed in a direction perpendicular to the sealing plate, and corresponding pieces of the positive electrode tab portion and the negative electrode tab portion are located on one end of the winding electrode body closer to the sealing plate than the other.

With this configuration, a flat-shaped winding electrode body is used, which has one end side in which the positive electrode tab portion and the negative electrode tab portion are formed, and which is in a direction in which the winding axis extends. The positive electrode tab portion and the negative electrode tab portion are disposed on one end of the winding electrode body closer to the sealing plate than the other end, and thus space which is not involved in power generation may be reduced in the battery case. Therefore, a high-capacity prismatic secondary battery having a higher volume energy density is obtained.

Furthermore, a plurality of flat-shaped winding electrode bodies is housed in the prismatic outer body, thereby making it possible to achieve a simple structure of the connecting portion between the positive electrode tab portion and the positive electrode current collector and the connecting portion between the negative electrode tab portion and the negative electrode current collector.

It is to be noted that the positive electrode current collector and the positive electrode terminal may be integrated as one component. The negative electrode current collector and the negative electrode terminal may be integrated as one component. In addition, the positive electrode current collector and the positive electrode terminal may be electrically connected via another conductive member. The negative electrode current collector and the negative electrode terminal may be electrically connected via another conductive member.

Preferably, the prismatic outer body includes a bottom, a pair of large-area side walls, and a pair of small-area side walls, an area of each of the small-area side walls is smaller than an area of each of the large-area side walls, and an area of the bottom is smaller than the area of each of the small-area side walls.

With this configuration, between six outer faces of the battery case formed by the prismatic outer body and the sealing plate, the faces of the bottom and the sealing plate have a smaller area than other four faces. Therefore, it is possible to reduce the space which is formed between the winding electrode body and the sealing plate for disposing the positive electrode tab portion, the negative electrode tab portion, the positive electrode current collector, and the negative electrode current collector. Therefore, a prismatic secondary battery having a higher volume energy density is achieved.

Preferably, the positive electrode plate includes a positive electrode core, and a positive electrode active material layer formed on the positive electrode core, the positive electrode core has a positive electrode core exposed portion in which the positive electrode active material layer is not formed, the negative electrode plate includes a negative electrode core, and a negative electrode active material layer formed on the negative electrode core, the negative electrode core has a negative electrode core exposed portion in which the negative electrode active material layer is not formed, the positive electrode tab portion is the positive electrode core exposed portion, and the negative electrode tab portion is the negative electrode core exposed portion.

The positive electrode tab portion is preferably formed of the positive electrode core. Also, the negative electrode tab portion is preferably formed of the negative electrode core. It is to be noted that the positive electrode tab portion and the negative electrode tab portion each may be a separate component from a core connected to the positive electrode core or the negative electrode core. For instance, a metal plate composed of aluminum, aluminum alloy, copper, copper alloy, nickel, or nickel alloy may be used as a tab portion.

Preferably, the positive electrode tab portion includes a linear portion and a curved portion, and the negative electrode tab portion includes a linear portion and a curved portion.

Preferably, at one widthwise end of the positive electrode plate, the pieces of the positive electrode tab portion having substantially the same width are formed at substantially regular intervals.

It is to be noted that the width of the positive electrode tab portion refers to the width of each positive electrode tab portion in the longitudinal direction of the positive electrode plate with the positive electrode plate developed. Also, the interval between the positive electrode tab portions refers to the distance between adjacent positive electrode tab portions in the longitudinal direction of the positive electrode plate with the positive electrode plate developed. To achieve substantially the same width, it suffices that the widths of the positive electrode tab portions fall in a range with ±10% difference. It is preferable that the widths of the positive electrode tab portions fall in a range with ±5% difference. Also, to achieve substantially the same interval, it suffices that the intervals between adjacent positive electrode tab portions fall in a range with ±10% difference. It is preferable that the intervals between adjacent positive electrode tab portions fall in a range with ±5% difference.

With this configuration, charge and discharge reactions in the positive electrode plate occur more uniformly. In addition, it is possible to produce the positive electrode plate easily.

Preferably, a width of the positive electrode tab portion is ¼ a width of the winding electrode body or greater and ½ the width of the winding electrode body or less.

Here, the width of the winding electrode body refers to the width in the direction perpendicular to the winding axis and perpendicular to the thickness direction of the winding electrode body.

Preferably, the pieces of the positive electrode tab portion are stacked with a displacement, thereby forming a positive electrode stepped portion which is constituted by ends of the pieces of the positive electrode tab portion, and a positive electrode current collector is connected to the positive electrode stepped portion.

Preferably, at one widthwise end of the negative electrode plate, the pieces of the negative electrode tab portion having substantially the same width are formed at substantially regular intervals.

It is to be noted that the width of the negative electrode tab portion refers to the width of each negative electrode tab portion in the longitudinal direction of the negative electrode plate with the negative electrode plate developed. Also, the interval between the negative electrode tab portions refers to the distance between adjacent negative electrode tab portions in the longitudinal direction of the negative electrode plate with the negative electrode plate developed. To achieve substantially the same width, it suffices that the widths of the negative electrode tab portions fall in a range with ±10% difference. It is preferable that the widths of the negative electrode tab portions fall in a range with ±5% difference. Also, to achieve substantially the same interval, it suffices that the intervals between adjacent negative electrode tab portions fall in a range with ±10% difference. It is preferable that the intervals between adjacent negative electrode tab portions fall in a range with ±5% difference.

With this configuration, charge and discharge reactions in the negative electrode plate occur more uniformly. In addition, it is possible to produce the negative electrode plate easily.

Preferably, a width of the negative electrode tab portion is ¼ the width of the winding electrode body or greater and ½ the width of the winding electrode body or less.

Preferably, the pieces of the negative electrode tab portion are stacked with a displacement, thereby forming a negative electrode stepped portion which is constituted by ends of the pieces of the negative electrode tab portion, and a negative electrode current collector is connected to the negative electrode stepped portion.

An assembled battery according to an aspect of the present disclosure includes: a plurality of the prismatic secondary batteries; a pair of end plates; and a bind bar that connects the pair of end plates. The prismatic secondary batteries are stacked between the pair of end plates in an orientation in which the respective large-area side walls are parallel, the positive electrode terminal and the negative electrode terminal of each of the prismatic secondary batteries are disposed on one lateral face, and a bottom of the prismatic outer body of each of the prismatic secondary batteries is disposed on the other lateral face.

According to the present disclosure, it is possible to provide a high-capacity prismatic secondary battery having a high volume energy density and an assembled battery using the prismatic secondary battery.

BRIEF DESCRIPTION OF THE SEVERAL VIEWS OF THE DRAWINGS

FIG. 6 is a plan view of a positive electrode plate according to the embodiment;

FIG. 7 is a plan view of a negative electrode plate according to the embodiment;

DETAILED DESCRIPTION OF THE INVENTION

The configuration of a prismatic secondary battery 20 according to an embodiment will be described below. It is to be noted that the present disclosure is not limited to the following embodiment.

As illustrated in FIGS. 1 to 5, the prismatic secondary battery 20 includes a prismatic outer body 1 having an opening, and a sealing plate 2 that seals the opening. The prismatic outer body 1 and the sealing plate 2 constitute a battery case. The prismatic outer body 1 and the sealing plate 2 are each preferably made of metal, and for instance, may be made of aluminum or aluminum alloy. The prismatic outer body 1 has a bottom 1$a$, a pair of large-area side walls 1$b$, and a pair of small-area side walls 1$c$. The prismatic outer body 1 is a bottomed tubular prismatic outer body which has an opening at a position opposed to the bottom. Flat-shaped winding electrode bodies 3, in which a positive electrode plate and a negative electrode plate are wound with a separator interposed therebetween (those components are not illustrated), are housed in the prismatic outer body 1 together with an electrolyte. In the positive electrode plate, a positive electrode active material layer including a positive electrode active material is formed on a positive electrode metal core. A positive electrode core exposed portion 4$b$, where the positive electrode core is exposed, is formed at a widthwise end of the positive electrode plate. It is to be noted that aluminum foil or aluminum alloy foil is preferably used for the positive electrode core. In the negative electrode plate, a negative electrode active material layer including a negative electrode active material is formed on a negative electrode metal core. A negative electrode core exposed portion 5$b$, where the negative electrode core is exposed, is formed at a widthwise end of the negative electrode plate. It is to be noted that copper foil or copper alloy foil is preferably used for the negative electrode core. In the prismatic secondary battery 20, the positive electrode core exposed portion 4$b$ constitutes a positive electrode tab portion 4$c$, and the negative electrode core exposed portion 5$b$ constitutes a negative electrode tab portion 5$c$.

Figure 2:
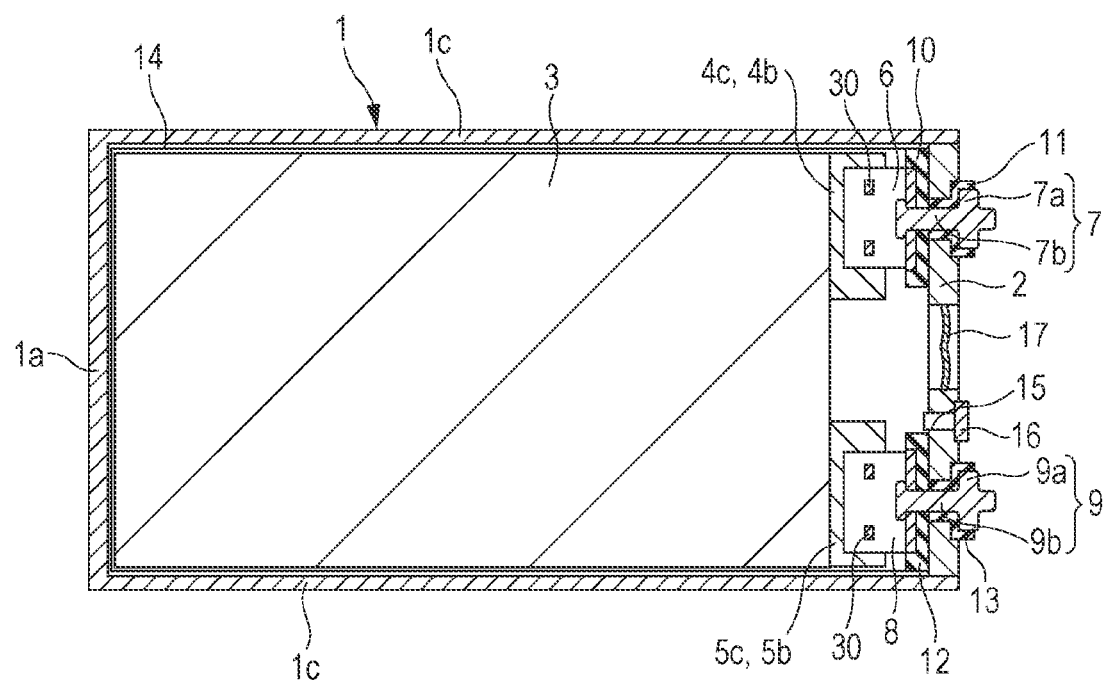
FIG. 2 is a sectional view taken along line II-II of FIG. 1.
Figure 3:
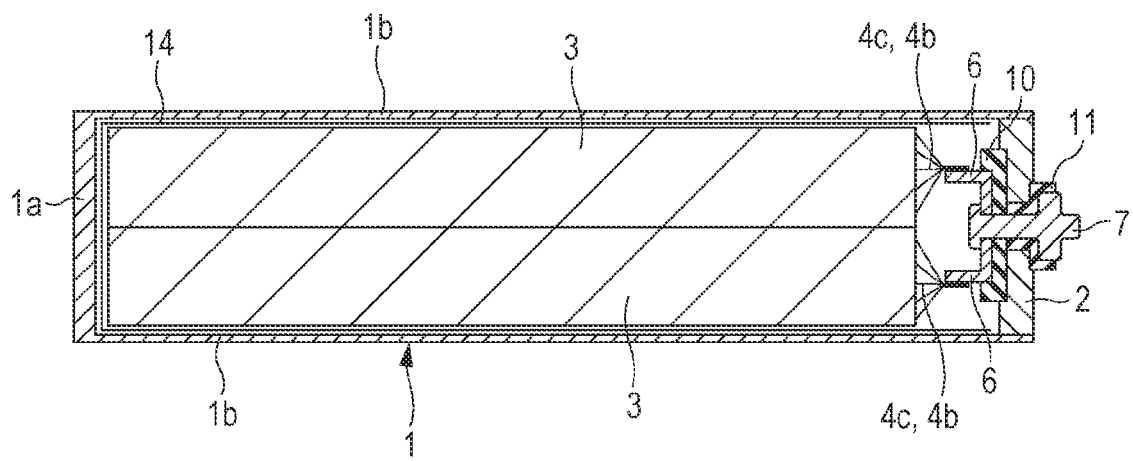
FIG. 3 is a sectional view taken along line of FIG. 1.
Figure 4:
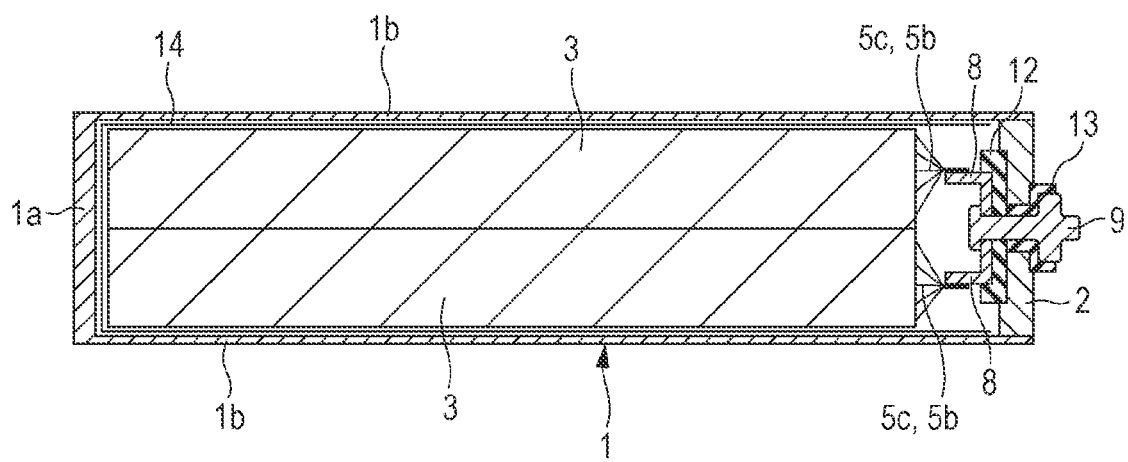
FIG. 4 is a sectional view taken along line IV-IV of FIG. 1.
Figure 5:
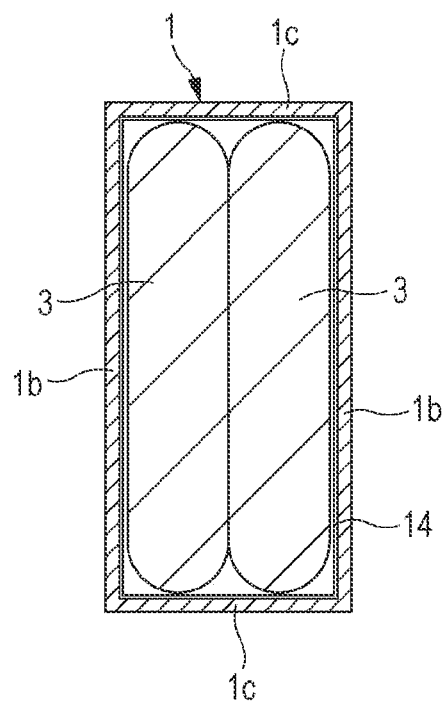
FIG. 5 is a sectional view taken along line V-V of FIG. 1.

As illustrated in FIGS. 2 to 4, in the prismatic outer body 1, two flat-shaped winding electrode bodies 3 are disposed so that the direction in which the winding axis extends is perpendicular to the sealing plate 2. The positive electrode core exposed portion 4$b$ and the negative electrode core exposed portion 5$b$ of each winding electrode body 3 are located on one end of the winding electrode body 3 closer to the sealing plate 2 than the other end. The positive electrode core exposed portions 4$b$ of the winding electrode bodies 3 are located on the same side (the upper side of FIG. 2), and the negative electrode core exposed portions 5$b$ of the winding electrode bodies 3 are located on the same side (the lower side of FIG. 2).

One end side of each winding electrode body 3 in the direction in which the winding axis extends is provided with the stacked positive electrode core exposed portions 4$b$ and the stacked negative electrode core exposed portions 5$b$. A positive electrode current collector 6 is welded to the stacked positive electrode core exposed portions 4$b$, and a welding spot 30 is formed. A positive electrode terminal 7 is electrically connected to the positive electrode current collector 6. A negative electrode current collector 8 is welded to the stacked negative electrode core exposed portions 5b, and a welding spot 30 is formed. A negative electrode terminal 9 is electrically connected to the negative electrode current collector 8.

The positive electrode terminal 7 and the positive electrode current collector 6 are each fixed to the sealing plate 2 via an insulating member 10 and a gasket 11. The negative electrode terminal 9 and the negative electrode current collector 8 are each fixed to the sealing plate 2 via an insulating member 12 and a gasket 13. The gaskets 11, 13 are disposed between the sealing plate 2 and the terminals 7, 9, respectively. The insulating members 10, 12 are disposed between the sealing plate 2 and the current collectors 6, 8, respectively. It is to be noted that the gasket and the insulating member are preferably composed of an insulating resin member. Each winding electrode body 3 is housed in the prismatic outer body 1 with covered by an insulating sheet 14 which is bent in a box shape. The insulating sheet 14 covers the winding electrode body 3 and is disposed between the winding electrode body 3 and the prismatic outer body 1. The sealing plate 2 is weld-connected to an opening edge of the prismatic outer body 1 by laser welding or the like. The sealing plate 2 has an electrolytic solution injection hole 15, which is sealed by a sealing plug 16 after injection. In the sealing plate 2, a gas exhaust valve 17 is formed for exhausting gas when the pressure inside the battery increases.

Figure 1:
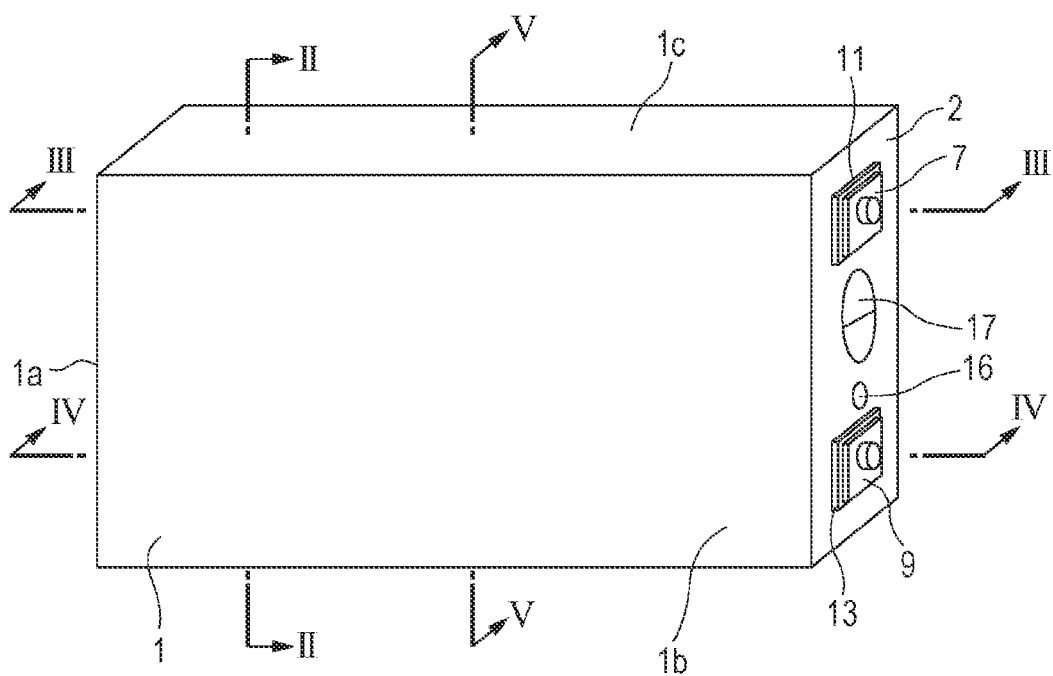
FIG. 1 illustrates a perspective view of a prismatic secondary battery according to an embodiment.

The dimensions of the prismatic secondary battery 20 may be, for instance, such that the width (the length in perpendicular direction to the sealing plate 2, the length in the crosswise direction in FIG. 1) is 18 cm, the thickness (the depth direction in FIG. 1) is 3 cm, and the height (the length in parallel to the sealing plate 2 and perpendicular to the thickness direction of the prismatic secondary battery 20, the length in the vertical direction in FIG. 1) is 9 cm. The present disclosure is particularly effective when the ratio of the width to the height of the prismatic secondary battery is greater than or equal to 2. The present disclosure is particularly effective when the height of the prismatic secondary battery is 10 cm or less and the width of the prismatic secondary battery is 17 cm or greater. In addition, the present disclosure is particularly effective when the battery capacity is 30 Ah or higher. It is to be noted that the value of battery capacity may be a designed capacity, that is, the value of the nominal capacity specified by a manufacturer of batteries.

Next, a method of manufacturing the prismatic secondary battery 20 will be described.

[Production of Positive Electrode Plate]

Positive electrode slurry including lithium cobalt oxide as a positive electrode active material polyvinylidene fluoride (PVdF) as a binder, a carbon material as a conductive material, and N-methylpyrrolidone (NMP) is produced. The positive electrode slurry is applied to both sides of a 15 µm-thick rectangular aluminum foil which is the positive electrode core. By drying the positive electrode slurry, the N-methylpyrrolidone in the positive electrode slurry is removed, and a positive electrode active material layer is formed on the positive electrode core. Subsequently, compression processing is performed so that the positive electrode active material layer has a predetermined thickness. The positive electrode plate thus obtained is cut so that the positive electrode core exposed portions with a predetermined width are formed with predetermined intervals at one widthwise end of the positive electrode plate.

As illustrated in FIG. 6, in the positive electrode plate 4 thus obtained, a positive electrode active material layer 4a is formed on the positive electrode core. At one widthwise end of the positive electrode plate 4, positive electrode core exposed portions 4b with a predetermined width are formed with predetermined intervals. It is to be noted that the positive electrode core exposed portions 4b constitute the positive electrode tab portions 4c.

Here, width W1 of each positive electrode tab portion 4c to 40 mm. Also, interval W2 between adjacent positive electrode tab portions 4c is 120 mm. It is to be noted that the width W1 of the positive electrode tab portions 4c is the width in the longitudinal direction of the positive electrode plate.

[Production of Negative Electrode Plate]

A negative electrode slurry including black lead as a negative electrode active material, styrene-butadiene rubber (SBR) as a binder, carboxymethyl cellulose (CMC) as a thickening agent, and water is produced. The negative electrode slurry is applied to both sides of a 8 µm-thick rectangular copper foil which is the negative electrode core. By drying the negative electrode slurry, the water in the negative electrode slurry is removed, and a negative electrode active material layer is formed on the negative electrode core. Subsequently, compression processing is performed so that the negative electrode active material layer has a predetermined thickness. The negative electrode plate thus obtained is cut so that the negative electrode core exposed portions with a predetermined width are formed with predetermined intervals at one widthwise end of the negative electrode plate.

As illustrated in FIG. 7, in the negative electrode plate 5 thus obtained, a negative electrode active material layer 5a is formed on the negative electrode core. At one widthwise end of the negative electrode plate 5, negative electrode core exposed portions 5b with a predetermined width are formed with predetermined intervals. It is to be noted that the negative electrode core exposed portions 5b constitute negative electrode tab portions 5c. The negative electrode core exposed portion 5b are also formed at the other widthwise end of the negative electrode plate 5.

Here, width W3 of each negative electrode tab portion 5c is 40 mm. Also, interval W4 between adjacent negative electrode tab portions 5c is 120 mm. It is to be noted that the width W3 of each negative electrode tab is the width in the longitudinal direction of the negative electrode plate 5.

It is preferable that the relationship of W1+W2>2L be satisfied between the width W1 of each positive electrode tab portion 4c, the interval W2 between adjacent positive electrode tab portions 4c, length L of a linear portion of the winding electrode body 3, and radius R of a curved portion of the winding electrode body 3. When W1+2πR<L and the start position for rolling the positive electrode plate is 0°, it is preferable that the start position for rolling the negative electrode plate be 180 to 270°.

It is preferable that the relationship of W3+W4>2L be satisfied between the width W2 of each negative electrode tab portion 5c, the interval W4 between adjacent negative electrode tab portions 5c, length L of a linear portion of the winding electrode body 3, and radius R of a curved portion of the winding electrode body 3.

[Winding Electrode Body]

The positive electrode plate 4 and the negative electrode plate 5 obtained by the above-described method are slid so that no overlap occurs between the positive electrode tab portions 4c and the negative electrode tab portions 5c, and a porous separator made of polyethylene is interposed between the positive electrode plate 4 and the negative electrode plate 5, which are stacked, wound, and pressed, thereby forming the flat-shaped winding electrode body 3.

Figure 8:
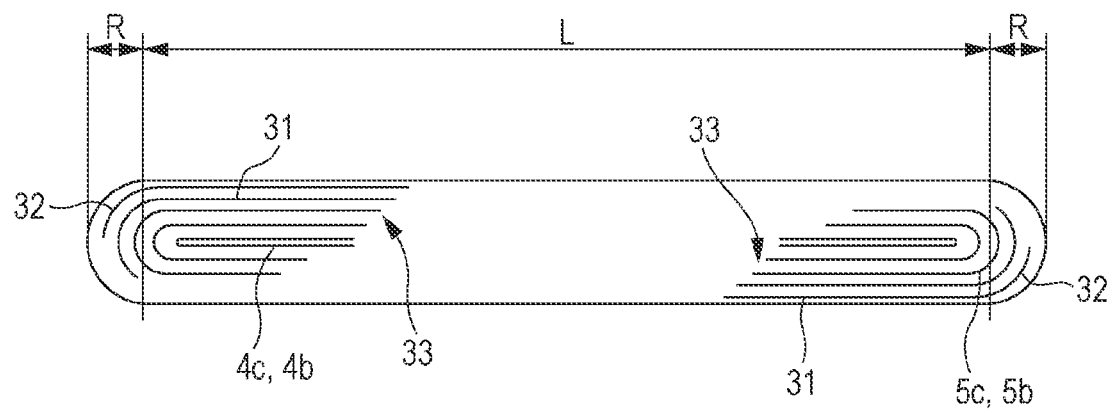
FIG. 8 is a view of a winding electrode body according to the embodiment, as seen in the direction in which a winding axis extends.

FIG. 8 is a view illustrating the surface on which the positive electrode tab portions 4c and the negative electrode tab portions 5c are formed. As illustrated in FIG. 8, the positive electrode tab portions 4c and the negative electrode tab portions 5c are disposed on one end side of the winding electrode body 3 in the direction in which the winding axis extends. The positive electrode tab portions 4c are stacked on one side of the winding electrode body 3 in the width direction (the direction perpendicular to the direction in which the winding axis of the winding electrode body 3 extends, and perpendicular to the thickness direction of the winding electrode body 3), and the negative electrode tab portions 5c are stacked on the other side of the winding electrode body 3.

The positive electrode tab portions 4c and the negative electrode tab portions 5c each have a linear portion 31 disposed on the linear portion (flat portion) of the winding electrode body 3, and a curve portion 32 disposed on a curved portion (bent portion) of the winding electrode body 3. In addition, the positive electrode tab portions 4c are disposed and stacked to be displaced sequentially by a small distance from the winding start to the winding end. The negative electrode tab portions 5c are also disposed and stacked to be displaced sequentially by a small distance from the winding start to the winding end. Therefore, a stepped portion 33, which is constituted by the ends of the positive electrode tab portions 4c, is formed in the stacked positive electrode tab portions 4c. In addition, a stepped portion 33, which is constituted by the ends of the negative electrode tab portions 5c, is formed in the stacked negative electrode tab portions 5c.

Two winding electrode bodies 3 thus produced are prepared and bundled securely by an insulating tape so that the positive electrode tab portions 4c and the negative electrode tab portions 5c of each winding electrode body 3 are disposed on the same side. It is to be noted that at least two winding electrode bodies 3 may be used and the number of winding electrode bodies 3 to be used is not particularly limited. Although a plurality of winding electrode bodies 3 is not necessarily fixed, the winding electrode bodies 3 are preferably bundled securely. The bundling method is not particularly limited, and the winding electrode bodies 3 may be secured by an insulating tape or bundled by being disposed in an insulating sheet which is molded in a bag shape or a box shape.

[Assembly of Sealing Plate, Current Collector, and Terminal]

As illustrated in FIGS. 1 and 2, on one end side of the sealing plate 2 in the longitudinal direction, the gasket 11 is disposed on the outer side of the sealing plate 2 and the insulating member 10 is disposed on the inner side of the sealing plate 2. The positive electrode terminal 7 has a flange portion 7a and an insert portion 7b. The positive electrode terminal 7 is disposed on the gasket 11, and the positive electrode current collector 6 is disposed on the undersurface of the insulating member 10. A through hole is formed in each of the gasket 11, the sealing plate 2, the insulating member 10, and the positive electrode current collector 6, and the positive electrode terminal 7 is inserted in each through hole and the distal end of the positive electrode terminal 7 is swaged, and thus the positive electrode terminal 7, the gasket 11, the sealing plate 2, the insulating member 10, and the positive electrode current collector 6 are integrally secured. It is preferable that the swaged portion of the positive electrode terminal 7 and the positive electrode current collector 6 be welded by laser welding or the like.

On the other end side of the sealing plate 2 in the longitudinal direction, the gasket 13 is disposed on the outer side of the sealing plate 2 and the insulating member 12 is disposed on the inner side of the sealing plate 2. The negative electrode terminal 9 has a flange portion 9a and an insert portion 9b. The negative electrode terminal 9 is disposed on the gasket 13, and the negative electrode current collector 8 is disposed on the undersurface of the insulating member 12. A through hole is formed in each of the gasket 13, the sealing plate 2, the insulating member 12, and the negative electrode current collector 8, and the negative electrode terminal 9 is inserted in each through hole and the distal end of the negative electrode terminal 9 is swaged, and thus the negative electrode terminal 9, the gasket 13, the sealing plate 2, the insulating member 12, and the negative electrode current collector 8 are integrally secured. It is preferable that the swaged portion of the negative electrode terminal 9 and the negative electrode current collector 8 be welded by laser welding or the like.

Figure 9:
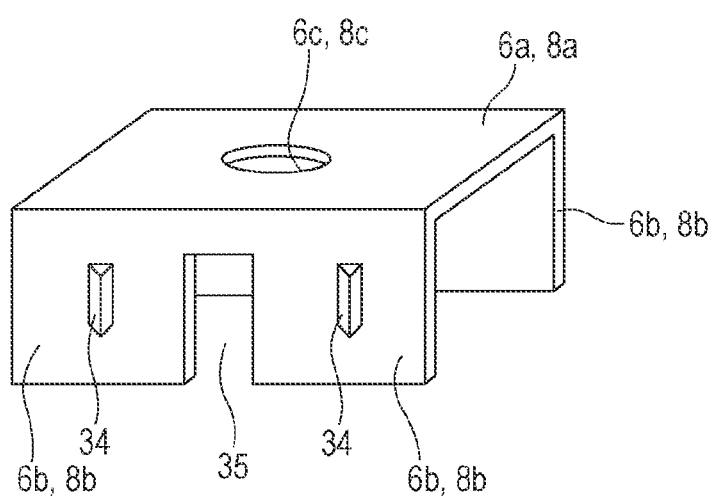
FIG. 9 is a perspective view of a current collector.

The positive electrode current collector 6 and the negative electrode current collector 8 illustrated in FIG. 9 are used. The positive electrode current collector 6 will be described as an example. The positive electrode current collector 6 has a base portion 6a to be connected to the positive electrode terminal 7, and a connecting portion 6b that extends from an end of the base portion 6a in the direction to the winding electrode body 3. A through hole 6c is formed in the base portion 6a. The positive electrode terminal 7 is inserted in the through hole 6c, and the distal end of the positive electrode terminal 7 is swaged on the base portion 6a, thereby connecting the positive electrode terminal 7 and the positive electrode current collector 6. The connecting portion 6b is provided in both ends (the end on the near side and the end on the far side in FIG. 9) of the base portion 6a in the thickness direction of the battery. A projection 34 is formed in each connecting portion 6b. Also, a slit 35 is formed in the connecting portion 6b. The negative electrode current collector 8 may also have the same shape as that of the positive electrode current collector 6. The positive electrode current collector 6 and the negative electrode current collector 8 are preferably formed by bending a plate-like metal member.

[Connection of Current Collector and Winding Electrode Body]

Figure 10:
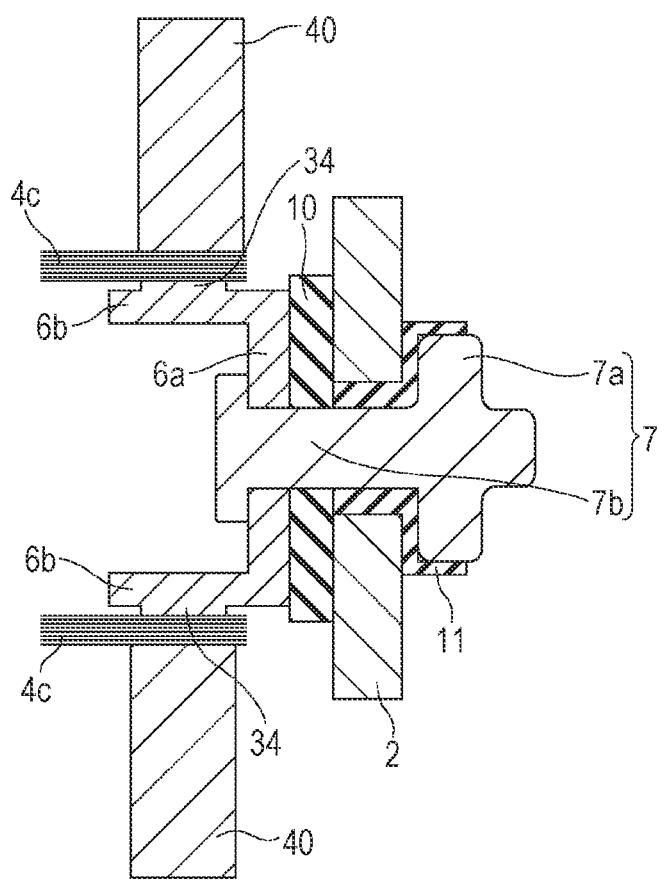
FIG. 10 is a view illustrating a process of connecting a tab portion and the current collector.

FIG. 10 is a view illustrating a process of connecting a tab portion and a current collector, and is a sectional view corresponding to FIG. 2 and FIG. 3. As illustrated in FIG. 10, in each of one surface side and the other surface side, the positive electrode tab portions 4c are disposed which are stacked on the projection 34 formed in the connecting portion 6b of the positive electrode current collector 6. With the stacked positive electrode tab portions 4c and the positive electrode current collector 6 interposed between a pair of resistance welding electrodes 40, a resistance welding current is fed and resistance welding is performed. Thus, the stacked positive electrode tab portions 4c and the positive electrode current collector 6 are weld-connected. For the negative electrode side also, the negative electrode tab portions 5c and the negative electrode current collector 8 are weld-connected in the same manner.

When the positive electrode current collector 6 or the negative electrode current collector 8 illustrated in FIG. 9 is used, welding connection is first performed on the portions where the projection 34 is formed on the near left side and on the far side of FIG. 9, by the method illustrated in FIG.

10. Subsequently, welding connection is performed on the portions where the projection 34 is formed on the near right side and on the far side of FIG. 9, by the method illustrated in FIG. 10. At this point, since the slit 35 is formed in each connecting portion 6b as illustrated in FIG. 9, when resistance welding is performed on the second spot, generation of reactive current (a current which is not involved in the resistance welding) passing through the first welding spot which has undergone resistance welding may be avoided. It is to be noted that with regard to the order of performing resistance welding, either the left side or the right side in FIG. 9 may be the first spot, or both sides may be the first spot at the same time. The same method may also be applied to the negative electrode side.

Figure 11:
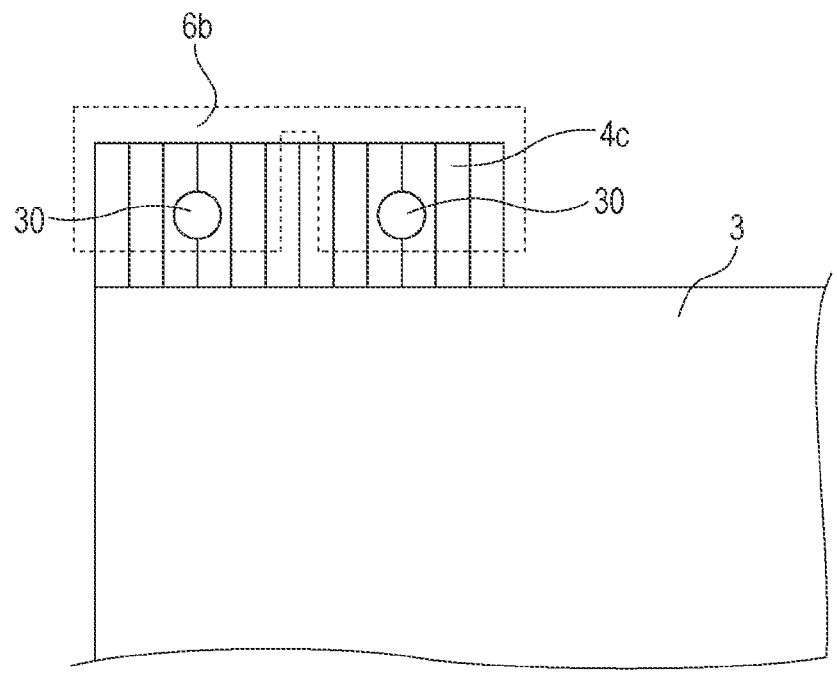
FIG. 11 is a view illustrating a connecting portion between the tab portion and the current collector.

As illustrated in FIG. 11, the positive electrode current collector 6 may be weld-connected to the stepped portion 33 of the positive electrode tab portions 4c. This allows the positive electrode current collector 6 to be more securely connected to not only the positive electrode tab portions 4c located on the outermost circumference of the winding electrode body 3, but also the positive electrode tab portions 4c located on the inner circumferential side of the winding electrode body 3. In addition, not only the positive electrode tab portions 4c located on the outermost circumference of the winding electrode body 3, but also the positive electrode tab portions 4c located on the inner circumferential side of the winding electrode body 3 are welded at positions near the positive electrode current collector 6. Therefore, current may be collected more uniformly. The same method may also be applied to the negative electrode side.

Next, the winding electrode body 3 connected to the positive electrode current collector 6 and the negative electrode current collector 8 is inserted in the prismatic outer body 1 with installed in the insulating sheet 14 bent in a box shape. The joint portion between the sealing plate 2 and the prismatic outer body 1 is then welded by laser welding, and the opening of the prismatic outer body 1 is sealed. Subsequently, a nonaqueous electrolyte is injected from the electrolysis solution injection hole 15 provided in the sealing plate 2, and the electrolysis solution injection hole 15 is sealed by the sealing plug 16, thereby producing the prismatic secondary battery 20.

In the prismatic secondary battery 20, the positive electrode tab portions 4c and the negative electrode tab portions 5c are each disposed on one end of the winding electrode body 3 closer to the sealing plate 2 than the other end in the winding electrode body 3. Therefore, space for disposing members not involved in power generation may be reduced in the prismatic outer body 1, and thus a prismatic secondary battery having a high volume energy density is achieved. In addition, in the prismatic secondary battery 20, the sealing plate 2 is disposed on the face with the smallest area, which is one of six faces of the battery case constituted by the prismatic outer body 1 and the sealing plate 2. In other words, the sealing plate 2 and the bottom 1a of the prismatic outer body 1 have an area smaller than the area of each of four side walls (a pair of large-area side walls 1b and a pair of small-area side walls 1c) of the prismatic outer body 1. Consequently, space for disposing members not involved in power generation may be reduced, and a prismatic secondary battery having a higher volume energy density is achieved.

Furthermore, in the prismatic secondary battery 20, a plurality of flat-shaped winding electrode bodies 3 is housed in the prismatic outer body 1.

Figure 12:
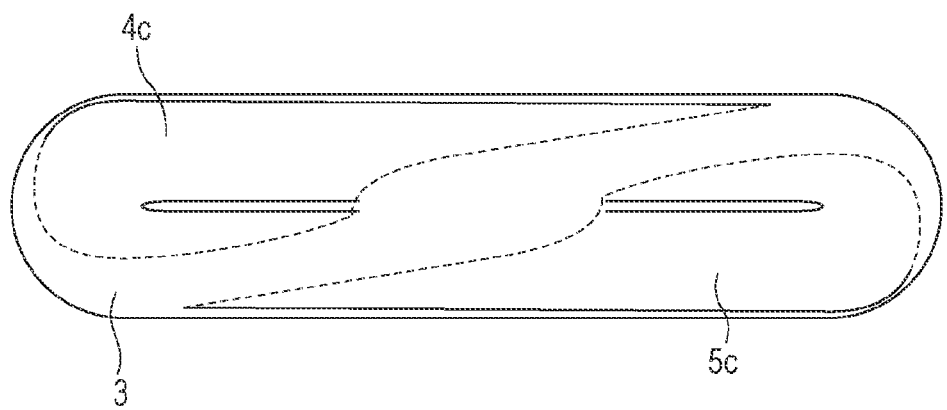
FIG. 12 is a view of a winding electrode body used for a prismatic secondary battery according to a comparative example.

When a prismatic secondary battery with a larger capacity (for instance, a battery capacity of 30 Ah or higher) is produced, if a single winding electrode body is housed in the prismatic outer body 1, the winding electrode body has a large number of winding and an increased thickness as illustrated in FIG. 12. In such a winding electrode body, position alignment of the positive electrode tab portions 4c and of the negative electrode tab portions 5c is difficult, and it is also difficult to increase the width of each positive electrode tab portion 4c and negative electrode tab portion 5c. In addition, there is a possibility that the positive electrode tab portions 4c and the negative electrode tab portions 5c are likely to come into contact with each other. Furthermore, connection between the positive electrode tab portions 4c and the positive electrode current collector 6, and connection between the negative electrode tab portions 5c and the negative electrode current collector 8 are difficult to make.

Figure 13:
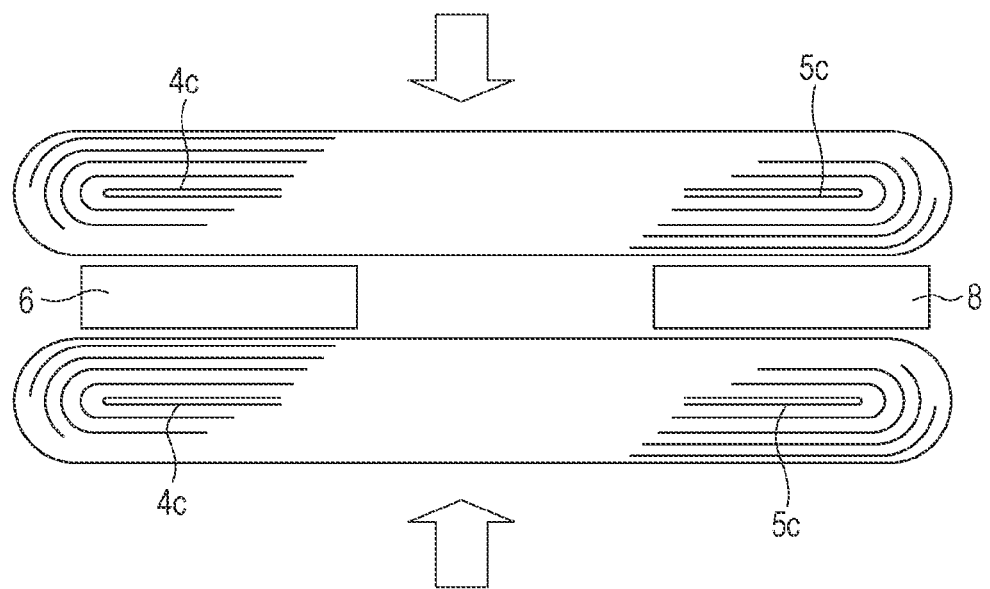
FIG. 13 is a view of a winding electrode body used for a prismatic secondary battery according to the embodiment.

In contrast to this, housing a plurality of flat-shaped winding electrode bodies 3 in the prismatic outer body 1 makes it easy to perform position alignment of the positive electrode tab portions 4c and of the negative electrode tab portions 5c. Also, contact between the positive electrode tab portions 4c and the negative electrode tab portions 5c may be easily prevented by increasing the width of each positive electrode tab portion 4c and negative electrode tab portion 5c (see FIG. 13). Therefore, dividing the electrode body to be housed in the prismatic outer body 1 into multiple pieces as in the prismatic secondary battery 20 allows the width of each positive electrode tab portion 4c and negative electrode tab portion 5c to be increased while preventing contact between the positive electrode tab portions 4c and the negative electrode tab portions 5c, thereby improving the current collection efficiency. Furthermore, it is possible to protect the positive electrode tab portions 4c and the negative electrode tab portions 5c against damage and fracture due to vibration. Consequently, a highly reliable prismatic secondary battery having a superior current collection efficiency is obtained.

<First Modification>

Figure 14:
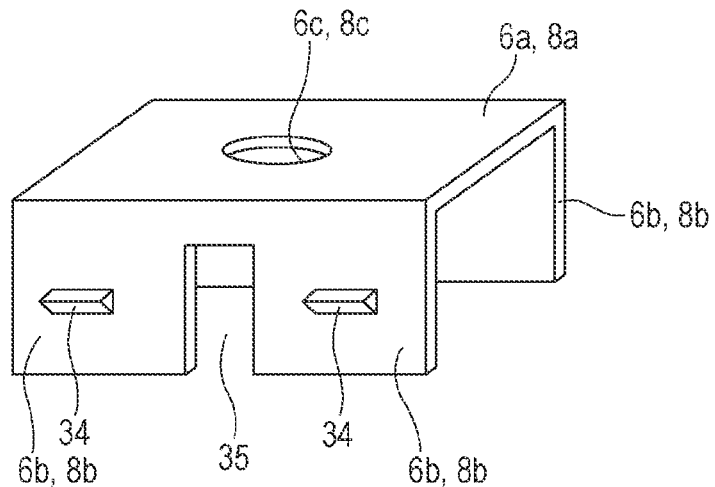
FIG. 14 is a perspective view of a current collector as a modification.

FIG. 14 illustrates a current collector according to a first modification. In the positive electrode current collector 6 (the negative electrode current collector 8), the projection 34 provided in each connecting portion 6b (8b) may be a linear projection that extends in a horizontal direction. With this configuration, the positional displacement of the resistance welding electrodes 40 with respect to the projection 34 at the time of welding may be allowed. Thus, a current collection structure having a higher productivity and a superior welding quality is achieved.

<Second Modification>

Figure 15:
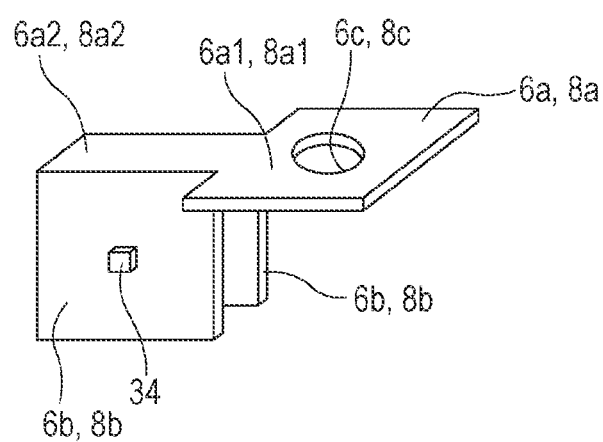
FIG. 15 is a perspective view of a current collector as a modification.

FIG. 15 illustrates a current collector according to a second modification. In the positive electrode current collector 6 (the negative electrode current collector 8), a portion where a welding spot is formed may be provided on each of the near side and the far side. Also, the projection 34 may also be punctiform (such as square, circular, hemispherical). Also, the base portion 6a (8a) has a wide-width portion 6a1 (8a1) which has a large width in the thickness direction of the prismatic secondary battery 20, and a narrow-width portion 6a2 (8a2) which has a smaller width than the wide-width portion 6a1 (8a1) in the thickness direction of the prismatic secondary battery 20. The positive electrode terminal 7 (the negative electrode terminal 9) is connected to the wide-width portion 6a1 (8a1). The connecting portions 6b (8b) are formed at ends of the narrow-width portion 6a2 (8a2). With this configuration, the area of the portion in the base portion 6a (8a), connected to the positive electrode terminal 7 (the negative electrode terminal 9) can be enlarged, and thus workability of connecting the positive electrode terminal 7 (the negative electrode terminal 9) to the base portion 6a (8a) improves. Since the area with both ends including a pair of connecting portions 6b (8b) can be small in the base portion 6a (8a), deformation of the base portion 6a (8a) may be reduced when the positive electrode current collector 6 (the negative electrode current collector 8) is interposed between a pair of resistance welding electrodes at the time of resistance welding.

<Third Modification>

Figure 16:
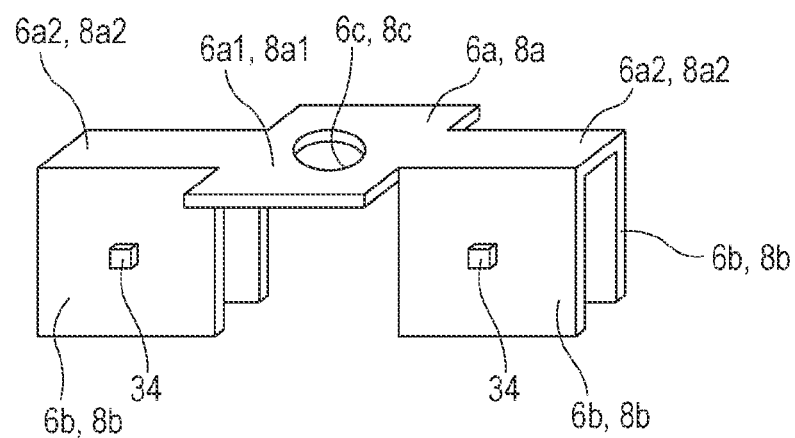
FIG. 16 is a perspective view of a current collector as a modification.

FIG. 16 illustrates a current collector according to a third modification. As illustrated, the narrow-width portions 6a2 (8a2) may be provided at both sides of the wide-width portion 6a1 (8a1). Also, each of both sides of one narrow-width portions 6a2 (8a2) may be provided with the connecting portions 6b (8b), and each of both sides of the other narrow-width portion 6a2 (8a2) may be provided with the connecting portions 6b (8b).

<Fourth Modification>

Figure 17:
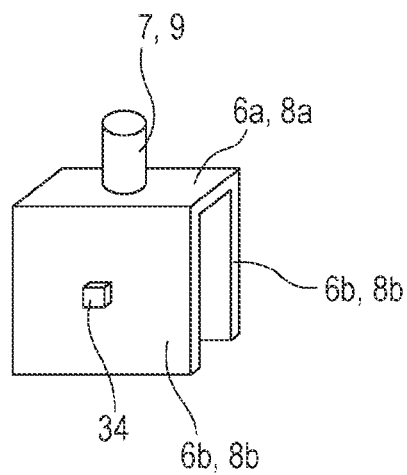
FIG. 17 is a perspective view of a current collector as a modification.

FIG. 17 illustrates a current collector according to a fourth modification. The positive electrode terminal 7 (the negative electrode terminal 9) may be connected to the base portion 6a (8a) by welding or the like in advance. When such a current collector is used, the positive electrode terminal 7 (the negative electrode terminal 9) is inserted in a through hole of the sealing plate 2 from the inner side of the battery, and the positive electrode terminal 7 (the negative electrode terminal 9) is fixedly swaged to an external conductive member disposed on the outer side of the battery.

<Fifth Modification>

Figure 18:
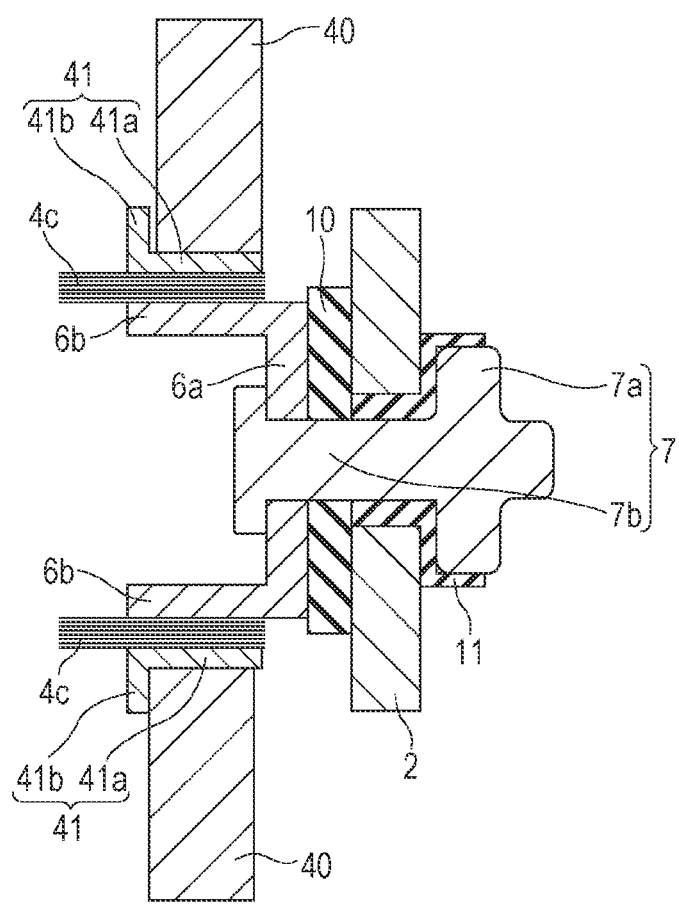
FIG. 18 is a view illustrating a process of connecting a tab portion and a current collector in a prismatic secondary battery as a modification.

FIG. 18 illustrates a process of connecting the positive electrode current collector 6 and the positive electrode tab portions 4c in a prismatic secondary battery according to a fifth modification. As illustrated in FIG. 18, a current collector receiving component 41 may be disposed on an outer surface of stacked positive electrode tab portions 4c, the outer surface being on the opposite side to the side where the connecting portion 6b of the positive electrode current collector 6 is disposed. The current collector receiving component 41 has a first area 41a disposed along the positive electrode tab portions 4c, and a bent portion 41b which is formed at an end of the first area 41a, the end being closer to the winding electrode body 3 than the other end. When the bent portion 41b is formed, even if sputtering occurs at the time of resistance welding, scattering of sputtered material toward a power generation unit (portion where the positive electrode plate 4 and the negative electrode plate 5 are stacked) of the winding electrode body 3 and damage to the power generation unit may be avoided.

<Sixth Modification>

Figure 19:
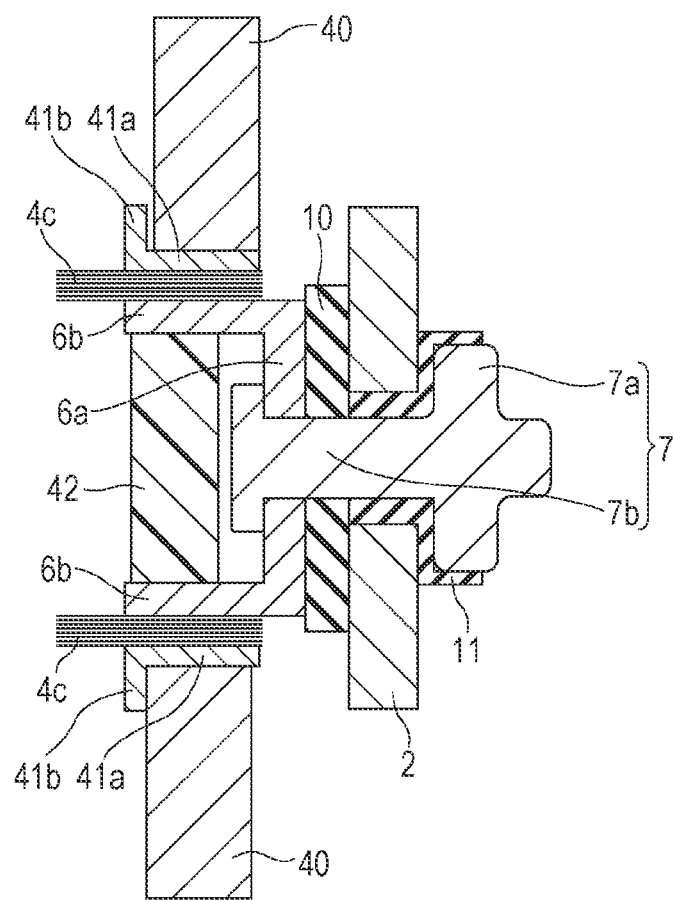
FIG. 19 is a view illustrating a process of connecting a tab portion and a current collector in a prismatic secondary battery as a modification.

FIG. 19 illustrates a process of connecting the positive electrode current collector 6 and the positive electrode tab portions 4c in a prismatic secondary battery according to a fifth modification. In the positive electrode current collector 6, a spacer 42 may be disposed between the connecting portion 6b on one side and the connecting portion 6b on the other side. Thus, when the stacked positive electrode tab portions 4c and the connecting portions 6b of the positive electrode current collector 6 are interposed between the pair of resistance welding electrodes 40, deformation of the positive electrode current collector 6 may be reduced. It is to be noted that the spacer 42 may be composed of a metal member or a resin member. The spacer 42 is preferably an insulating resin member. Also, the spacer 42 may be plate-shaped, block-shaped, or pillar-shaped.

The details of the embodiment and modifications described above are applicable to each of the positive electrode side and the negative electrode side.

In the embodiment and modifications described above, an example has been illustrated in which connection between the positive electrode tab portions and the positive electrode current collector and connection between the negative electrode tab portions and the negative electrode current collector are made by resistance welding. However, the connection may also be made by another method. For instance, instead of the resistance welding, ultrasonic welding or welding by high energy rays such as a laser may be used.

<Seventh Modification>

Figure 20:
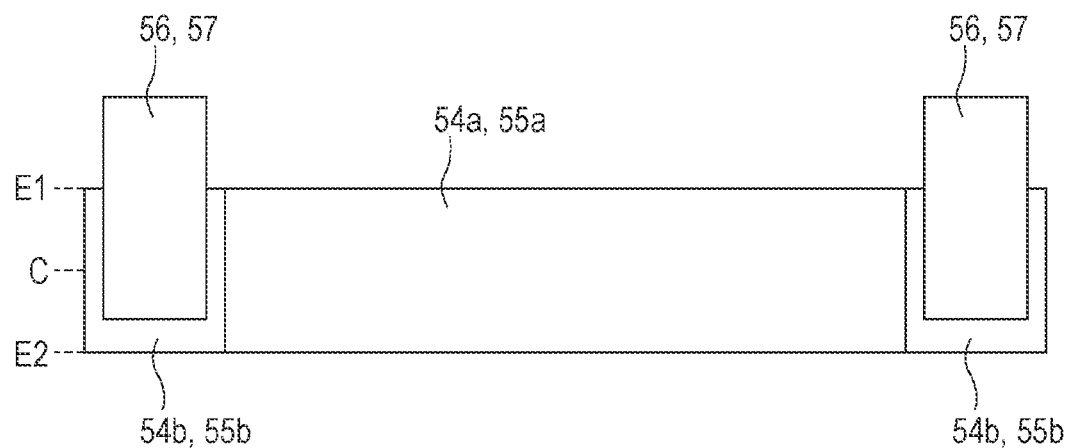
FIG. 20 is a plan view of a positive electrode plate and a negative electrode plate according to a modification.

The following configuration may be adopted to a winding electrode body according to a modification. FIG. 20 is a plan view of the positive electrode plate 54 (the negative electrode plate 55). In the positive electrode plate 54 (the negative electrode plate 55), a positive electrode active material layer 54a (55a) is formed on the positive electrode core (the negative electrode core). Positive electrode core exposed portions 54b (negative electrode core exposed portions 55b) are formed at both ends of the positive electrode plate 54 (the negative electrode plate 55) in the longitudinal direction. A positive electrode tab 56 (a negative electrode tab 57) is connected by welding to each of the positive electrode core exposed portions 54b (the negative electrode core exposed portions 55b). The positive electrode tab 56 (the negative electrode tab 57) is preferably a metal plate having a thickness greater than that of the positive electrode core (the negative electrode core).

Figure 21:
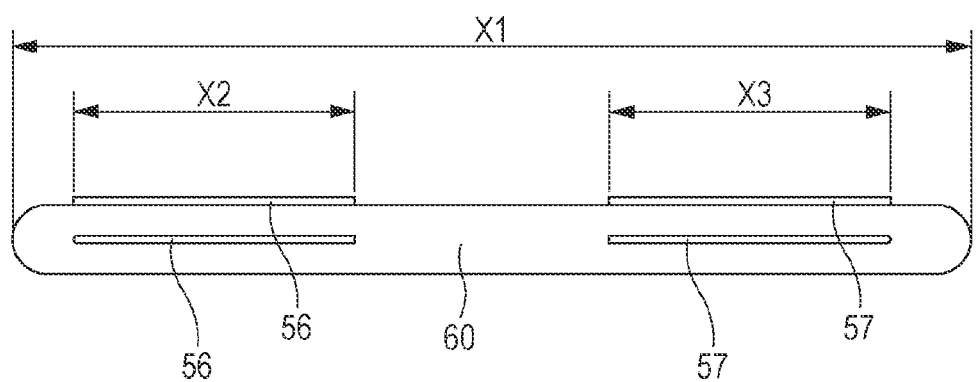
FIG. 21 is a view illustrating a winding electrode body according to a modification.

The positive electrode plate 54 and the negative electrode plate 55 like this are wound with a separator interposed therebetween, and a flat-shaped winding electrode body 60 is formed in which each of the positive electrode tabs 56 and the negative electrode tabs 57 projects from one end in the axial direction of flat-shaped winding (FIG. 21). Then using a plurality of such flat-shaped winding electrode bodies 60, it is possible to produce a prismatic secondary battery. For instance, the flat-shaped winding electrode bodies 60 are stacked and used in the orientation of FIG. 21. In this case, it is preferable that four or more flat-shaped winding electrode bodies 60 be used. By using four or more flat-shaped winding electrode bodies 60 like this, a prismatic secondary battery, which avoids the reduction in current collection performance and yet has a high volume energy density, is achieved.

It is to be noted that the widths X2 and X3 of the positive electrode tab 56 and the negative electrode tab 57 are each preferably ¼ the width X1 of the flat-shaped winding electrode body 60 or greater. This enables the reduction of internal resistance and a prismatic secondary battery having an improved vibration resistance is achieved. In order to achieve a prismatic secondary battery having a further improved vibration resistance, it is preferable that the positive electrode tab 56 (negative electrode tab 57) be disposed from one end E1 to the other end E2 crossing a center line C in the width direction of the positive electrode plate 54 (the negative electrode plate 55) as illustrated in FIG. 20. This enables the winding electrode body 60 to be securely connected to the sealing plate via the positive electrode tabs 56 and the negative electrode tabs 57.

<Current Cutoff Mechanism>

Either one of a conductive path between the positive electrode plate and the positive electrode terminal and a conductive path between the negative electrode plate and the negative electrode terminal may be provided with a current cut-off mechanism that operates with increasing internal pressure of the battery and blocks the conductive path between the positive electrode plate and the positive electrode terminal or the conductive path between the negative electrode plate and the negative electrode terminal to cut off the current. In this case, the operating pressure of a gas exhaust valve preferably has a value greater than the operating pressure of the current cut-off mechanism.

The current cut-off mechanism preferably includes a deformation plate that deforms with increasing internal pressure of the battery, and a breaking portion that breaks due to deformation of the deformation plate. The breaking portion is preferably formed in the positive electrode current collector. In this case, for instance, the positive electrode current collector may be the positive electrode current collector 6 illustrated in FIG. 15. In the positive electrode current collector 6, a thin-walled portion or a notched portion is formed as the breaking portion in the periphery of the through hole 6c. A deformation plate is disposed above the base portion 6a of the positive electrode current collector 6. The periphery of the through hole 6c is then weld-connected to the lower surface of the deformation plate by laser welding or the like. Thus, when the deformation plate is deformed upward with increasing internal pressure of the battery, the thin-walled portion or the notched portion provided in the base portion 6a breaks and a conductive path is cut off. In such a case, connection between the positive electrode tab portions 4c and the positive electrode current collector 6 is preferably made by resistance welding. Thus, in contrast to the case where the positive electrode tab portions 4c and the positive electrode current collector 6 are ultrasonic-welded, adverse effect of vibration on the breaking portion may be reduced. Also, in contrast to the case where the positive electrode tab portions 4c and the positive electrode current collector 6 are laser-welded, adverse effect of sputtering on the breaking portion may be reduced. In addition, due to the formation of the wide-width portion 6a1 (8a1), a breaking portion may be easily formed. When an insulating member is disposed between the deformation plate and the base portion 6a, and the insulating member and the base portion 6a are fixed, the wide-width portion 6a1 (8a1) allows easy fixing. As a method for this, for instance, a through hole or a notch is provided in the wide-width portion 6a1 (8a1), and a projection formed in the insulating member may be fitted into the through hole or the notch. Also, a portion in the base portion, where the connecting portion 6b is formed, is the narrow-width portion 6a2, and so when the positive electrode tab portions 4c are connected to the connecting portion 6b, deformation of the base portion 6a is reduced, and thus the degree of damage on the breaking portion may be reduced.

Figure 22:
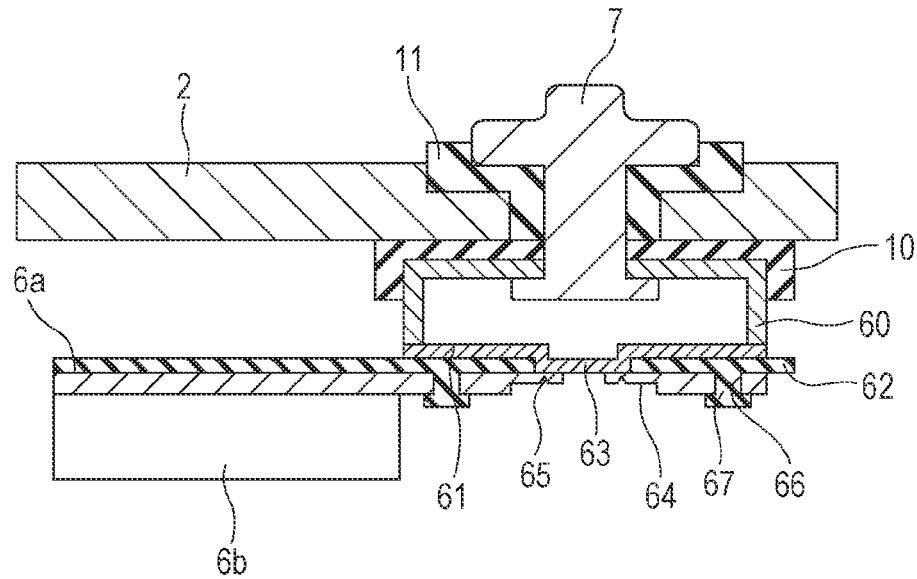
FIG. 22 is a sectional view of a current cutoff mechanism of a prismatic secondary battery according to a modification.

FIG. 22 illustrates a sectional view of a prismatic secondary battery having the current cut-off mechanism. It is to be noted that the sectional view corresponds to the enlarged view of the positive electrode terminal and its periphery in FIG. 2. A cup-shaped conductive member 60 having a tubular portion is disposed on the lower surface of the insulating member 10. Near the insulating member 10, the conductive member 60 has a through hole, in which the positive electrode terminal 7 is inserted, and the conductive member 60 is connected to the positive electrode terminal 7. The conductive member 60 has an opening on the inner side of the battery. The deformation plate 61 is disposed so as to block the opening. The peripheral edge of the deformation plate 61 is weld-connected to the conductive member 60, and the opening is sealed by the deformation plate 61. The positive electrode current collector 6 is connected to the surface, on the inner side of the battery, of the deformation plate 61. The positive electrode current collector 6 has a through hole 63, the edge of which is weld-connected to the deformation plate 61. In the periphery of a portion which is weld-connected, a thin-walled portion 64 is formed. A circular groove 65 is formed in the thin-walled portion 64. When the pressure inside the battery increases, a central portion of the deformation plate 61 is deformed so as to move upward toward the sealing plate 2. In conjunction with this, the connecting portion between the deformation plate 61 and the positive electrode current collector 6 is pulled toward the sealing plate 2 and the circular groove 65 breaks. Thus, the conductive path between the positive electrode plate and the positive electrode terminal 7 is cut off and charging current is blocked. This enables the protection against further development of overcharge.

It is to be noted that an insulating plate 62 made of resin is disposed between the deformation plate 61 and the positive electrode current collector 6. The insulating plate 62 is latched and fixed to an insulating plate 10 (not illustrated). The insulating plate 62 has a projection 67 for fixation, and the projection 67 is inserted in a through hole 66 for fixation formed in the positive electrode current collector 6, and the diameter of the end of the projection 67 is expanded. Thus, the insulating plate 62 and the base portion 6a of the positive electrode current collector 6 are connected and fixed.

Figure 23:
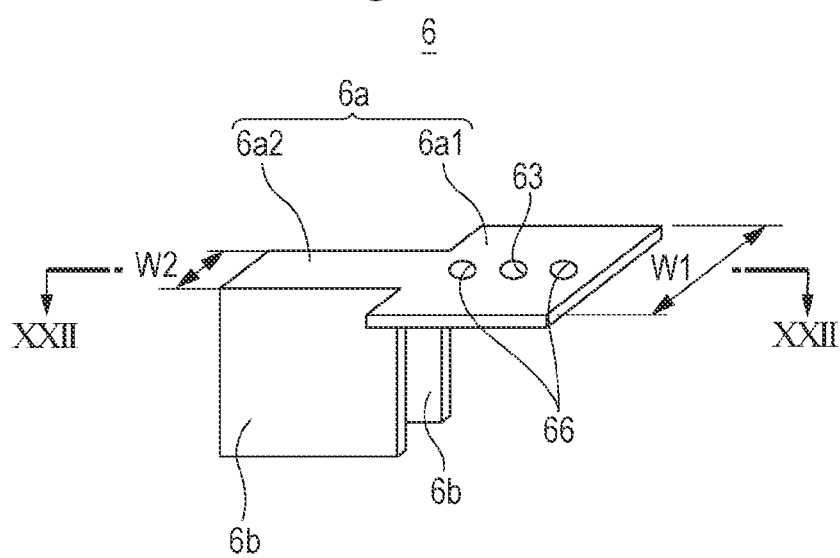
FIG. 23 is a perspective view of a current collector body used for the current cutoff mechanism.

FIG. 23 is a perspective view of the positive electrode current collector 6 used for the current cut-off mechanism. It is to be noted that FIG. 22 corresponds to a sectional view taken along line XXII-XXII of FIG. 23. The positive electrode current collector 6 has the base portion 6a and the connecting portions 6b that extend from the base portion 6a toward the electrode body. The base portion 6a has a wide-width portion 6a1 which has a large width in the thickness direction (the direction of the shorter side of the sealing plate) of the prismatic secondary battery, and a narrow-width portion 6a2 which has a smaller width than the wide-width portion 6a1 in the thickness direction of the prismatic secondary battery. In the wide-width portion 6a1, the base portion 6a is connected to the deformation plate 61. Also, in the wide-width portion 6a1, the base portion 6a is fixed to the insulating plate 62. The connecting portions 6b are provided in the narrow-width portion 6a2.

With the current cut-off mechanism thus formed, when the positive electrode tab portions 4c are weld-connected to the connecting portions 6b of the positive electrode current collector 6, adverse effect on a fragile portion (expected breaking portion) provided in the base portion 6a, and the connecting portion between the deformation plate 61 and the base portion 6a may be reduced. For instance, scattering of sputtered material to the fragile portion or the connecting portion may be reduced, the sputtered material being generated at the time of welding the connecting portions 6b and the positive electrode tab portions 4c. Or deformation of the periphery of the fragile portion and the connecting portion in the base portion 6a is reduced due to stress at the time of welding the connecting portions 6b and the positive electrode tab portions 4c. It is preferable that the relationship of W1/W2≥3/2 be satisfied between the width W1 of the wide-width portion 6a1 and the width W2 of the narrow-width portion 6a2.

It is to be noted that the current cut-off mechanism in this configuration is effective even when a single winding electrode body is housed in the prismatic outer body. In addition, the current cut-off mechanism in this configuration is effective even when stacked electrode bodies are housed in the prismatic outer body.

The following configuration may be adopted for an assembled battery using a plurality of prismatic secondary batteries 20.

Figure 24:
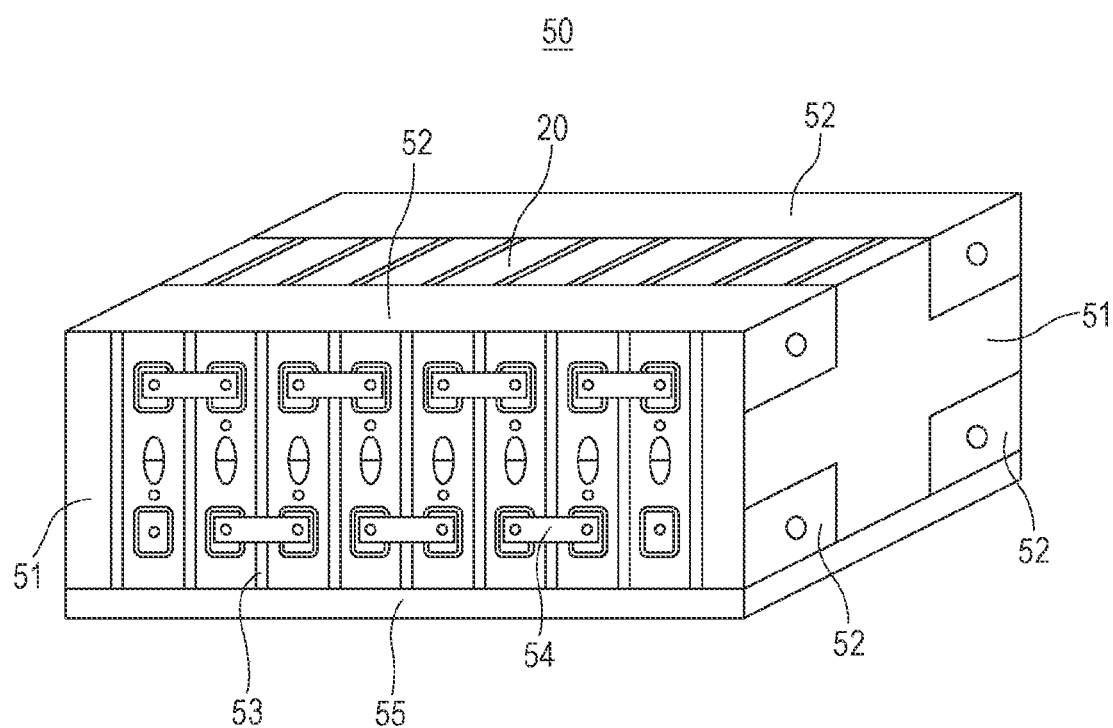
FIG. 24 is a perspective view of an assembled battery according to the embodiment.

As illustrated in FIG. 24, in an assembled battery 50, a plurality of prismatic secondary batteries 20 is stacked between a pair of end plates 51 in an orientation in which respective large-area side walls are parallel. The pair of end plates 51 are connected by a bind bar 52. It is to be noted that the end plates and a bus bar are connected using a bolt or a rivet or by welding. An insulating separator 53 is disposed between the prismatic secondary batteries 20, and the separator 53 is preferably composed of a resin. In the assembled battery 50, the positive electrode terminal 7 and the negative electrode terminal 9 of each prismatic secondary battery 20 are disposed on one lateral face (the lateral face on the near side in FIG. 24). Terminals of adjacent prismatic secondary batteries 20 are connected by a bus bar 54. The bottom of each prismatic secondary battery 20 is disposed on the other lateral face (the lateral face on the far side in FIG. 24). The small-area side walls of each prismatic secondary battery 20 are disposed on the upper surface and the lower surface of the assembled battery 50. By adopting this configuration, a low-height assembled battery having an extremely high volume energy density is achieved. The assembled battery 50 thus constructed is mounted in a vehicle in the orientation illustrated in FIG. 24, thereby achieving significantly improved occupant comfort in the vehicle.

It is to be noted that a cooling plate 55, in which a cooling medium flows, is disposed in the bottom surface of the assembled battery 50, and each prismatic secondary battery 20 is preferably cooled by the cooling plate. It is to be noted that the cooling medium may be a gas or a liquid.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A prismatic secondary battery comprising:
    a first flat-shaped winding electrode body in which a first positive electrode plate and a first negative electrode plate are wound with a first separator interposed therebetween;
    a second flat-shaped winding electrode body in which a second positive electrode plate and a second negative electrode plate are wound with a second separator interposed therebetween;
    a prismatic outer body that has an opening and a bottom and that houses the first flat-shaped winding electrode body and the second flat-shaped winding electrode body;
    a sealing plate that seals the opening;
    a positive electrode terminal that is electrically connected to the first positive electrode plate and the second positive electrode plate and attached to the sealing plate;
    a positive electrode current collector that electrically connects the first positive electrode plate and the second positive electrode plate and the positive electrode terminal;
    a negative electrode terminal that is electrically connected to the first negative electrode plate and the second negative electrode plate and attached to the sealing plate; and
    a negative electrode current collector that electrically connects the first negative electrode plate and the second negative electrode plate and the negative electrode terminal,
    wherein the first flat-shaped winding electrode body includes a plurality of first positive electrode tab portions and a plurality of first negative electrode tab portions at one end in a direction in which a winding axis of the first flat-shaped winding electrode body extends, and
    wherein the second flat-shaped winding electrode body includes a plurality of second positive electrode tab portions and a plurality of second negative electrode tab portions at one end in a direction in which a winding axis of the second flat-shaped winding electrode body extends,
    the first flat-shaped winding electrode body and the second flat-shaped winding electrode body are housed in the prismatic outer body so that the winding axis of the first flat-shaped winding electrode body and the winding axis of the second flat-shaped winding electrode body are disposed in a direction substantially perpendicular to the sealing plate,
    the plurality of first positive electrode tab portions and the plurality of first negative electrode tab portions are located on one end of the first flat-shaped winding electrode body closer to the sealing plate than the other end, and
    the plurality of second positive electrode tab portions and the plurality of second negative electrode tab portions are located on one end of the second flat-shaped winding electrode body closer to the sealing plate than the other end,
    wherein the negative electrode current collector includes a first welding portion welded to the negative electrode terminal, and a second welding portion welded to the plurality of the first negative electrode tab portions,
    the first welding portion is spaced away from the second welding portion in a longitudinal direction of the sealing plate, and
    a distance between the bottom and the first welding portion is greater than a distance between the bottom and the second welding portion in the direction substantially perpendicular to the bottom.

2. The prismatic secondary battery according to claim 1, wherein the negative electrode current collector includes a base portion and a connecting portion,
    the connecting portion comprises a bent end portion extending from the base portion,
    an insulating member is disposed between the sealing plate and the base portion,
    the negative electrode terminal is connected to the base portion, and
    the plurality of first negative electrode tab portions are stacked upon each other and welded to the connecting portion.

3. The prismatic secondary battery according to claim 1, wherein the first negative electrode tab portion is longer than the connecting portion of the negative electrode current collector in a longitudinal direction of the sealing plate.

4. The prismatic secondary battery according to claim 1, wherein the plurality of first negative electrode tab portions are stacked upon each other and are collectively disposed between, and welded to, the negative electrode current collector and a current collector receiving component.

\* \* \* \* \*